United States Patent [19]

Inoue et al.

[11] 4,104,327
[45] Aug. 1, 1978

[54] ADHESIVE COMPOSITIONS

[75] Inventors: Hisaaki Inoue, Fujisawa; Hisataka Komai, Kamakura; Seiichi Okada, Yokohama, all of Japan

[73] Assignee: Nippon Zeon Co. Ltd., Tokyo, Japan

[21] Appl. No.: 648,325

[22] Filed: Jan. 12, 1976

[30] Foreign Application Priority Data

| Jan. 16, 1975 [JP] | Japan | 50/7211 |
| Jan. 22, 1975 [JP] | Japan | 50/9578 |

[51] Int. Cl.$^2$ ............... C08L 7/00; C08L 9/00; C08L 9/06
[52] U.S. Cl. ............... 260/876 B; 260/33.6 AQ; 260/33.6 UA; 260/892; 260/894; 427/207 B; 526/308
[58] Field of Search ............... 260/876 B, 878; 526/237, 308

[56] References Cited

U.S. PATENT DOCUMENTS

| 3,658,740 | 4/1972 | Marrs et al. | 260/876 B X |
| 3,660,323 | 5/1972 | Raguse | 260/876 B X |
| 3,763,125 | 10/1973 | Moody et al. | 526/237 |
| 3,784,530 | 1/1974 | Osborn | 526/283 |
| 3,872,064 | 3/1975 | Pace et al. | 526/339 |
| 3,880,953 | 4/1975 | Downey | 260/876 B |
| 3,893,986 | 7/1975 | Komai et al. | 526/221 |
| 3,932,328 | 1/1976 | Korpman | 260/876 B X |
| 3,954,692 | 5/1976 | Downey | 260/876 B X |
| 3,956,223 | 5/1976 | Chiang et al. | 260/876 B X |

*Primary Examiner*—Thomas De Benedictis, Sr.
*Attorney, Agent, or Firm*—Sherman & Shalloway

[57] ABSTRACT

An adhesive composition comprising
(A) 100 parts by weight of an elastomer consisting of (I) 30 to 100% by weight of a thermoplastic elastomer expressed by the general formula $(S-B)_n$ or $(S-B)_{n-1}-S$ in which S is substantially a polystyrene block, B is substantially a polybutadiene block, and $n$ is an integer of from 2 to 10, and (II) 70 to 0% by weight of a thermoplastic elastomer expressed by the general formula $(S-I)_n$ or $(S-I)_{n-1}-S$ in which S is substantially a polystyrene block, I is substantially a polyisoprene block, and $n$ is an integer of from 2 to 10, and
(B) 50 to 250 parts by weight of a hydrocarbon resin containing 40 to 95% by weight of a 1,3-pentadiene unit and 60 to 5% by weight of an α-methylstyrene unit in the polymer chain and having a softening point of 60° to 140° C.

20 Claims, No Drawings

ADHESIVE COMPOSITIONS

This invention relates to a novel adhesive composition, and more specifically, to a novel adhesive composition comprising a thermoplastic elastomeric block polymer derived from styrene and butadiene or a mixture of the block polymer with a thermoplastic elastomeric block polymer derived from styrene and isoprene, and a hydrocarbon resin composed mainly of 1,3-pentadiene and α-methylstyrene.

It has been well known that a thermoplastic elastomeric block polymer derived from a monovinyl aromatic hydrocarbon and a conjugated diolefin can be used as a base polymer for pressure-sensitive adhesives or hot-melt adhesives. For example, when a block polymer of the A—B—A type is mixed with a tackifying resin such as a rosin-type resin or terpene resin and a process oil, an adhesive composition is obtained which is useful in various fields, for example, as a pressure-sensitive adhesive, hot-melt adhesive or latex adhesive (U.S. Pat. No. 3,239,478). Likewise, an adhesive composition useful as a pressure-sensitive adhesive is obtained by mixing a block polymer of the A—B—A type with an aliphatic hydrocarbon resin (British Patent No. 1,277,363). Compositions useful as various kinds of adhesives can be obtained by mixing a tackifying resin with a block polymer of the A—B—A—B type or a block polymer of the A—B—A—B—A type (Japanese Patent Publication No. 330/74).

Based on these prior art techniques, we made various experiments about adhesive compositions comprising thermoplastic elastomeric block polymers and tackifying resins, and evaluated the properties of the resulting adhesive compositions according to the types of the block polymers and the tackifying resins, and combinations of these materials. It has been found that when a block polymer derived from styrene and 1,3-butadiene is used, the resulting adhesive composition has far inferior tackiness, adhesive strength and cohesive force to an adhesive composition containing a block polymer derived from styrene and isoprene.

It is an object of this invention therefore to provide an adhesive composition having superior tackiness, adhesive strength and cohesive force as a result of remedying such defects of the adhesive composition prepared from a block polymer derived from styrene and butadiene.

We have found that when a specific hydrocarbon resin is mixed as a tackifying resin with a block polymer derived from styrene and butadiene, the resulting adhesive composition exhibits far superior properties to compositions obtained by using a terpene resin or an ordinary aliphatic or aromatic hydrocarbon resin as the tackifying resin, and the tackiness of the resulting adhesive composition is better than that of an adhesive composition prepared by using a block polymer derived from styrene and isoprene. We also found that an adhesive composition having better properties can be obtained by mixing the above-mentioned specific hydrocarbon with a mixture of a block polymer derived from styrene and butadiene and a block polymer derived from styrene and isoprene.

Thus, according to this invention there is provided an adhesive composition comprising (A) 100 parts by weight of an elastomer consisting of
 (I) 30 to 100% by weight, preferably 35 to 85% by weight, of a thermoplastic elastomer expressed by the general formula $(S-B)_n$ or $(S-B)_{n-1}-S$ in which S is substantially a polystyrene block, B is substantially a polybutadiene block, and $n$ is an integer of from 2 to 10, and (II) 70 to 0% by weight, preferably 65 to 15% by weight, of a thermoplastic elastomer expressed by the general formula $(S-I)_n$ or $(S-I)_{n-1}-S$ in which S is substantially a polystyrene block, I is substantially a polyisoprene block, and $n$ is an integer of from 2 to 10, and (B) 50 to 250 parts by weight, preferably 60 to 200 parts by weight, of a hydrocarbon resin containing 40 to 95% by weight, preferably 60 to 90% by weight, of a 1,3-pentadiene unit and 60 to 5% by weight, preferably 40 to 10% by weight, of an α-methylstyrene unit in the polymer chain and having a softening point of 60° to 140° C.

Both of the thermoplastic elastomers (I) and (II) used in this invention are block polymers having a styrene content of 10 to 70% by weight, preferably 15 to 55% by weight, and an average molecular weight of 25,000 to 500,000, preferably 40,000 to 200,000. These elastomers include "tapered block polymers" which contain a copolymer having a small amount of a styrene unit in a proportion progressively increasing from one end of the block to the other as "a substantial polybutadiene block" or "a substantial polyisoprene block", or hydrogenated block polymers in which the double bonds of the polybutadiene block or polyisoprene block are hydrogenated partly or wholly. These block polymers are known, and can be prepared by known methods using lithium-type initiators, for example, the methods disclosed in U.S. Pat. Nos. 3,251,905 and 3,265,765, British Patent No. 1,130,770, and Japanese Patent Publication No. 2394/68.

Any block polymers corresponding to the above general formulae can be used in this invention. Of these, however, block polymers of the above general formulae in which n is 2, that is, block polymers expressed by the general formula S—B—S, S—I—S, S—B—S—B, or S—I—S—I, are most preferably used. Block polymers expressed by the formula S—B, S—I, B—S—B or I—S—I are excluded from the scope of this invention since they do not give adhesive compositions having satisfactory properties.

In the present invention, the thermoplastic elastomer (A) used consists of 30 to 100% by weight, preferably 35 to 85% by weight, of the block polymer (I) derived from styrene and butadiene and 70 to 0% by weight, preferably 65 to 15% by weight, of the block polymer (II) derived from styrene and isoprene. When the amount of the block polymer (I) is less than 30% by weight, the resulting adhesive composition has reduced tackiness, and moreover, this results in the use of a larger amount of the block polymer (II) which is expensive. Accordingly, this is economically disadvantageous.

The hydrocarbon resin (B) used in this invention can be readily prepared by copolymerizing a monomeric mixture composed of 40 to 95% by weight, preferably 60 to 90% by weight, of 1,3-pentadiene and 60 to 5% by weight, preferably 40 to 10% by weight, of α-methylstyrene in the presence of a Friedel-Crafts catalyst. Various hydrocarbon resins such as aliphatic hydrocarbon resins or aromatic hydrocarbon resins have been developed to date, and a copolymer of 1,3-pentadiene and 2-methyl-2-butene (U.S. Pat. No. 3,577,398), a copolymer of 1,3-pentadiene and cyclopentene (Japanese Patent Publication No. 4701/75), and a terpolymer of 1,3-pentadiene, cyclopentene and diisobutylene (U.S. Pat. No. 3,893,986), for example, are known as hydrocarbon resins composed mainly of a 1,3-pentadiene unit. In the present invention, however, a copolymer of 1,3-pentadiene and α-methylstyrene in the specific proportions given above is selectively used. In addition, only when the α-methylstyrene content of the copolymer is 60 to 5% by weight, especially 40 to 10% by weight, an adhesive composition having superior tackiness, adhesive strength and cohesive force can be obtained. Satisfactory adhesive compositions cannot be obtained even when commercially available ordinary hydrocarbon resins or hydrocarbon resins prepared by the above-mentioned prior art techniques are mixed with the elastomer (A). Adhesive compositions having superior properties can neither be obtained by using hydrocarbon resins having an α-methylstyrene content of less than 5% by weight or above 60% by weight.

The hydrocarbon resin (B) used in this invention may contain another copolymerizable comonomer (other than 1,3-pentadiene and α-methylstyrene) as a structural unit in an amount of the range which does not essentially impair the effects of the present invention. Examples of such a comonomer are aliphatic or alicyclic monolefins or diolefins containing 4 to 10 carbon atoms. Of these, cyclopentene is especially useful. When a terpolymer containing up to 25% by weight, preferably 3 to 25% by weight, more preferably 5 to 20% by weight in the polymer chain of a third comonomer is used as the hydrocarbon resin (B), an adhesive composition having better tackiness than in the case of using a bi-component copolymer of 1,3-pentadiene and α-methylstyrene can be obtained. 1,3-Butadiene is also a useful comonomer. When a four-component copolymer obtained by using 1,3-butadiene as a fourth monomer in addition to 1,3-pentadiene, α-methylstyrene and cyclopentane, and containing up to 25% by weight, preferably 1 to 25% by weight, more preferably 2 to 20% by weight, of the 1,3-butadiene unit in the polymer chain, is used as the hydrocarbon resin (B), the tackiness of the resulting adhesive composition is increased further. Such a terpolymer or four-component copolymer can be readily prepared by copolymerizing a mixture of 1,3-pentadiene and α-methylstyrene with cyclopentene or with both cyclopentene and 1,3-butadiene.

The adhesive composition of this invention comprises 100 parts by weight of the elastomer (A) and 50 to 250 parts by weight, preferably 60 to 200 parts by weight, of the hydrocarbon resin (B), but may further contain various additives such as softening agents, antioxidants, or waxes. Examples of the softeners are ester-type synthetic oils such as phthalate ester or adipate esters, liquid resins such as a polybutene oil, polybutadiene oil, polypentadiene oil, a liquid hydrocarbon resin, a liquid terpene resin or a liquid rosin, and extender oils such as naphthenic process oils, aromatic process oils, and paraffinic process oils. The amount of the softener is usually 5 to 200 parts by weight, preferably 25 to 125 parts by weight, per 100 parts by weight of the elastomer (A). Furthermore, the adhesive composition of this invention may contain other elastomers (than the elastomer A) and/or other hydrocarbon resins (than the hydrocarbon resin B) in amounts which do not impair the effects of the present invention.

In the preparation of the adhesive composition of the present invention, the elastomer (A), the hydrocarbon resin (B), and other additives as an optional component can be mixed by known methods. For example, they can be mixed in the presence of a volatile aliphatic, alicyclic or aromatic hydrocarbon solvent, or at an elevated temperature of 80° to 300° C.

The adhesive compositions so obtained are very useful as solution-type or hot-melt type pressure sensitive adhesives. They also find utility as hot-melt adhesives.

The following Examples, Referential Examples and Comparative Example illustrate the present invention more specifically. All parts and percentages in these examples are by weight.

REFERENTIAL EXAMPLE 1

Monomeric mixtures consisting of a major proportion of 1,3-pentadiene and minor proportions of other monomers were each copolymerized in the presence of a benzene solvent using aluminum chloride as a catalyst. Various hydrocarbon resins having the properties shown in Table 1 were obtained. The softening points of the polymers were measured by the ring-and-ball method set forth in JIS K-2531. The melt viscosities of the polymers were measured at 200° C. using a Brookfield viscometer. The proportions of the structural units of the polymers were calculated by comparing the monomer proportions in the starting monomeric mixture with the proportions of the unreacted monomers in the resulting polymer recovered.

The results are shown in Table 1.

Table 1

| Polymer | A | B | C | D | E | F* | G** | H*** |
|---|---|---|---|---|---|---|---|---|
| Structural units (%) | | | | | | | | |
| 1,3-pentadiene | 70 | 70 | 60 | 60 | 60 | 70 | 55 | 78 |
| α-methylstyrene | 30 | 20 | 25 | 25 | 30 | — | — | — |
| cyclopentene | — | 10 | 10 | 10 | 10 | 30 | — | 9 |
| 1,3-butadiene | — | — | 5 | — | — | — | — | — |
| diciplopentadiene | — | — | — | 5 | — | — | — | — |
| 2-methylbutene-2 | — | — | — | — | — | — | 45 | — |
| diisobutylene | — | — | — | — | — | — | — | 13 |
| Properties | | | | | | | | |
| Softening point (° C) | 110 | 100 | 85 | 100 | 95 | 100 | 90 | 100 |
| Melt viscosity (CPS) | 400 | 160 | 80 | 130 | 100 | 350 | 155 | 160 |

*the hydrocarbon resin disclosed in Japanese Patent Publication 4701/75
**the hydrocarbon resin disclosed in United States Patent 3,577,398
***the hydrocarbon resin disclosed in United States Patent 3,893,986

REFERENTIAL EXAMPLE 2

Styrene (15 parts), 70 parts of 1,3-butadiene and 15 parts of styrene were successively fed, and polymerized in the presence of cyclohexane using n-butyl lithium as a catalyst to afford a block polymer of the S—B—S type having a molecular weight of about 148,000 and a styrene content of 30%. The block polymer obtained was thermoplastic and elastomeric.

REFERENTIAL EXAMPLE 3

The procedure of Referential Example 2 was repeated except that isoprene was used instead of 1,3-butadiene. A block polymer of the S—I—S type having a molecular weight of about 148,000 and a styrene content of 30% was obtained. This block polymer was thermoplastic and elastomeric.

REFERENTIAL EXAMPLE 4

Styrene (15 parts), 35 parts of 1,3-butadiene, 15 parts of styrene and 35 parts of 1,3-butadiene were successively fed, and polymerized in the presence of cyclohexane using n-butyl lithium as a catalyst to afford a block polymer of the S—B—S—B type having a molecular weight of about 155,000 and a styrene content of 30%. The block polymer obtained was thermoplastic and elastomeric.

REFERENTIAL EXAMPLE 5

The procedure of Referential Example 4 was repeated except that isoprene was used instead of 1,3-butadiene. A block polymer of the S—I—S—I type having a molecular weight of about 155,000 and a styrene content of 30% was obtained. The block polymer obtained was thermoplastic and elastomeric.

EXAMPLE 1

100 parts of the block polymer of the S—B—S type obtained in Referential Example 2 was dissolved in 600 parts of toluene, and 100 parts of each of the tackifying resins shown in Table 2, 60 parts of a naphthenic process oil (SHELLFLEX 371N, trademark for a product of Shell Chemical Co.) and 1 part of an antioxidant were added to form a solvent-type pressure-sensitive adhesive containing non-volatile components in a concentration of about 30%.

The solution obtained was coated to a thickness of 25 microns on a polyester film having a thickness of 1 mm to form an adhesive tape, and its tackiness, adhesive strength and cohesive strength were measured.

The tackiness was measured in accordance with the J. Dow method [Proc. Inst. Rub. Ind. 1, 105 (1954)] as follows: A 10 cm adhesive tape sample is placed on the inclined surface of a stainless steel plate inclined at 30° with the adhesive surface facing upward. 32 stainless steel balls with a diameter varying from 1/32 inch to 1 inch are each allowed to roll at an initial speed of 0 over the adhesive surface of the tape from a position 10 cm upward of the upper edge of the tape. The tackiness is expressed by the diameter of a ball that has the largest diameter among those which stop on the adhesive tape.

The adhesive strength was measured in accordance with JIS Z-1522 as follows: An adhesive tape sample, 25 mm wide and 100 mm long, is bonded onto a stainless steel plate polished with a #280 waterproof abrasive paper, and peeled in a direction at an angle of 180° C at a speed of 200 mm/min. at 25° C. The peel strength measured is the adhesive strength.

The cohesive strength was measured in accordance with JIS Z-1542 as follows: An adhesive tape sample is bonded to a similarly treated stainless steel plate so that its are of 25 mm × 10 mm makes contact with the tape surface. A load of 1 Kg is exerted vertically on the lower end of the tape at 50° C., and the time required until the adhesive tape is displaced and falls off from the stainless steel plate is measured.

The results are shown in Table 2.

Table 2

| Sample | | Tackifying resin | Tackiness (1/32 inch) | Adhesive strength (g/inch) | Cohesive strength (minutes) |
|---|---|---|---|---|---|
| Invention | 1 | polymer A | 15 | 800 | 120 |
| | 2 | polymer B | 20 | 930 | 150 |
| | 3 | polymer C | 27 | 780 | 110 |
| | 4 | polymer D | 20 | 920 | 120 |

Table 2-continued

| Sample | | Tackifying resin | Tackiness (1/32 inch) | Adhesive strength (g/inch) | Cohesive strength (minutes) |
|---|---|---|---|---|---|
| | 5 | polymer E | 25 | 910 | 115 |
| Control | 6 | polymer F | 3> | 980 | 6 |
| | 7 | polymer G | 3> | 600 | 8 |
| | 8 | polymer H | 3> | 620 | 5 |
| | 9 | commercial grade A* | 3> | did not adhere | unmeasureable |
| | 10 | commercial grade B** | 3> | 670 | 22 |

*Aromatic hydrocarbon resin having a softening point of 100° C.
**Terpene resin having a softening point of 115° C.

It can be seen from the results obtained that adhesive compositions of this invention containing a copolymer derived from 1,3-pentadiene and α-methylstyrene as a tackifying resin have very superior tackiness and cohesive strength and superior adhesive strength to those which contain other aliphaic hydrocarbon resins, aromatic hydrocarbon resins, or terpene resins as the tackifying resin.

EXAMPLE 2

Solution-type pressure-sensitive adhesives were prepared in the same way as in Example 1 except that various thermoplastic elastomeric block polymers shown in Table 3 were used instead of the S—B—S type block polymer used in Example 1, and polymer C prepared in Referential Example 1 was used as the tackifying resin. The properties of these adhesives were evaluated in the same way as in Example 1. The results are shown in Table 3.

Table 3

| Sample | | Block polymer | Tackiness (1/32 inch) | Adhesive strength (g/inch) | Cohesive strength (minutes) |
|---|---|---|---|---|---|
| Invention | 3 | S-B-S (*1) | 27 | 780 | 110 |
| | 11 | S-B-S-B (*2) | 26 | 740 | 115 |
| | 12 | Kraton 1101 (*3) | 26 | 790 | 125 |
| | 13 | Kraton 1102 (*4) | 29 | 760 | 50 |

(*1) Block polymer prepared in Referential Example 2
(*2) Block polymer prepared in Referential Example 3
(3*) and (*4) Block polymers of the S-B-S type available commercially from Shell Chemical Co.

These results demonstrate that according to this invention, the use of a block polymer of the S—B—S—B type gives equally superior results as in the case of using a block polymer of the S—B—S type.

EXAMPLE 3

100 Parts of the S—B—S type block polymer obtained in Referential Example 2 was dissolved in 470 parts of toluene, and then 100 parts of each of the various tackifying resins indicated in Table 4, and 1 part of an antioxidant were added to prepare a solution-type pressure-sensitive adhesive having an involatile content of about 30%. The solution was coated on a polyester film in the same way as in Example 1, and its properties as an adhesive were evaluated. The results are shown in Table 4.

Table 4

| Sample | | Tackifying resin | Tackiness (1/32 inch) | Adhesive strength (g/inch) | Cohesive strength (minutes) |
|---|---|---|---|---|---|
| Invention | 14 | polymer C | 6 | 1200 | 250< |
| | 15 | polymer F | 3> | did not adhere | Unmeasurable |
| | 16 | polymer G | 3> | " | " |

Table 4-continued

| Sample | | Tackifying resin | Tackiness (1/32 inch) | Adhesive strength (g/inch) | Cohesive strength (minutes) |
|---|---|---|---|---|---|
| Control | 17 | polymer H | 3> | " | " |
| | 18 | Commercial grade A* | 3> | " | " |
| | 19 | Commercial grade B** | 3> | " | " |

* and **: Same as indicated in the footnote to Table 2.

These results demonstrate that the adhesive composition of this invention has good properties even when it does not contain a softener.

EXAMPLE 4

100 Parts of the S—B—S type block polymer obtained in Referential Example 2 was dissolved in toluene, and the polymer C obtained in Referential Example 1 was added in varying amounts as indicated in Table 5. Furthermore, 60 parts of a naphthenic process oil and 1 part of an antioxidant were added, and then toluene was again added to afford a solution-type pressure-sensitive adhesive having an involatile content of about 30%. The solution was coated on a polyester film in the same way as in Example 1, and its properties as an adhesive were evaulated. The results are shown in Table 5.

Table 5

| Samples | | Amount of the polymer C (parts) | Tackiness (1/32 inch) | Adhesive strength (g/inch) | Cohesive strength (minutes) |
|---|---|---|---|---|---|
| | 20 | 60 | 29 | 550 | 120 |
| Invention | 3 | 100 | 27 | 780 | 110 |
| | 21 | 150 | 20 | 1700 | 95 |
| | 22 | 200 | 15 | 2100 | 90 |

EXAMPLE 5

100 Parts of the S—B—S type block polymer polyester obtained in Referential Example 2, 100 parts of polymer A, polymer B or polymer C obtained in Referential Example 1 as a tackifying resin, 60 parts of a naphthenic process oil and 1 part of an antioxidant were melted at 170° C. to form a homogeneous composition. The resulting composition in the molten state was coated on a 1 mm-thick polyester film to a thickness of 50 microns to form an adhesive tape. In the same way as in Example 1, the tackiness, adhesive strength and cohesive strength of the resulting adhesive tapes were measured. These properties were found to be substantially the same as those of the solution-type pressure-sensitive adhesives obtained in Example 1. Polymer C exhibited the best operability in the coating of the composition in the molten state on the polyester film, and polymer B and polymer A came next in this order.

EXAMPLE 6

70 Parts of the S—B—S type block polymer obtained in Referential Example 2 and 30 parts of the S—I—S type block polymer obtained in Referential Example 3 were dissolved in 600 parts of toluene, and then, 100 parts of each of the tackifying resins shown in Table 6, 60 parts of a naphthenic process oil (Shellflex 371N, a trademark for a product of Shell Chemical Co.) and 1 part of an antioxidant were added to afford a solution-type pressure-sensitive adhesive having an involatile content of about 30%. The resulting solution was coated on a polyester film in the same way as in Example 1, and its properties as an adhesive were evaluated. The results are shown in Table 6.

Table 6

| Sample | | Tackifying resin | Tackiness (1/32 inch) | Adhesive strength (g/inch) | Cohesive strength (minutes) |
|---|---|---|---|---|---|
| Invention | 23 | polymer A | 20 | 1000 | 125 |
| | 24 | polymer B | 26 | 1150 | 160 |
| | 25 | polymer C | 38 | 900 | 115 |
| | 26 | polymer D | 27 | 1050 | 130 |
| | 27 | polymer E | 34 | 1010 | 120 |
| Control | 28 | polymer F | 11 | 960 | 30 |
| | 29 | polymer G | 10 | 950 | 40 |
| | 30 | polymer H | 11 | 980 | 45 |
| | 31 | Commercial grade A* | 3 | did not adhere | unmeasurable |
| | 32 | Commercial grade B** | 15 | 1000 | 85 |

* and ** Same as indicated in the footnote to Table 2.

From these results it can be seen that adhesive compositions of this invention containing a copolymer derived from 1,3-pentadiene and α-methylstyrene as a tackifying resin are far superior in tackiness and cohesive strength to those containing other aliphatic hydrocarbon resins, aromatic hydrocarbon resins, or terpene resins as the tackifying resin.

EXAMPLE 7

100 Parts of each of the block polymer mixtures shown in Table 7 was dissolved in 700 parts of toluene, and then 100 parts of polymer C as a tackifying resin, 30 parts of a coumarone resin (Coumaron AH, softening point 115° C., trademark for a product of Ouchi Shinko Company) and 1 part of an antioxidant were added to afford a solution-type pressure-sensitive adhesive having an involatile content of about 30%. The solution was coated on a polyester film in the same way as in Example 1 to form an adhesive tape, and its properties were evaluated in the same way as in Example 1. The results are shown in Table 7.

Table 7

| Sample | Block polymer mixture | Tackiness (1/32 inch) | Adhesive strength (g/inch) | Cohesive strength (minutes) |
|---|---|---|---|---|
| 25 | Mixture I (*1) | 34 | 1300 | 120< |
| 33 | Mixture II (*2) | 33 | 1290 | 120< |
| 34 | Mixture III (*3) | 34 | 1350 | 120< |

(*1) A mixture consisting of 70 parts of the S-B-S type block polymer obtained in Referential Example 2 and 30 parts of the S-I-S type block polymer obtained in Referential Example 3.
(*2) A mixture consisting of 70 parts of the S-B-S-B type block polymer obtained in Referential Example 4 and 30 parts of the S-I-S-I type block polymer obtained in Referential Example 5.
(*3) A mixture consisting of 70 parts of Kraton 1101 (trademark for S-B-S type block polymer of Shell Chemical Co.) and 30 parts of Kraton 1107 (trademark for S-I-S type block polymer of Shell Chemical Co.).

These results demonstrate that according to the present invention, equally superior results can be obtained in the case of using the S—B—S—B type or S—I—S—I type block polymer as in the case of using the S—B—S and S—I—S type block polymers.

EXAMPLE 8

Solution-type pressure-sensitive adhesives were prepared in the same way as in Example 7 except that the S—B—S type block polymer and the S—I—S type block polymer obtained in Referential Examples 2 and 3 were used in the proportions shown in Table 8 as thermoplastic elastomers. The properties of these adhesives were evaulated in the same way as in Example 1. The results are shown in Table 8.

Table 8

| Sample | 35 | 36 | 37 | 38 | 39 | 40 |
|---|---|---|---|---|---|---|
| Recipe | | | | | | |
| S-B-S type block polymer (parts) | 100 | 85 | 70 | 50 | 35 | — |
| S-I-S type block polymer (parts) | — | 15 | 30 | 50 | 65 | 100 |
| Properties | | | | | | |
| Tackiness (1/32 inch) | 24 | 30 | 34 | 31 | 29 | 20 |
| Adhesive strength (g/inch) | 880 | 920 | 1030 | | | |
| | 1030 | 1200 | 1230 | | | |
| Cohesive strength (minutes) | 120< | 120< | 120< | 120< | 120< | 120< |

It can be seen from the results that when a mixture of the S—B—S type block polymer and the S—I—S type block polymer is used, the resulting composition has markedly superior tackiness as compared with the case of using these resins singly.

Generally, when a coumarone resin is conjointly used as a component of a tackifying resin, the tackiness tends to decrease and the adhesive strength and cohesive strength tend to increase. The same effect can be seen in the absence of the coumarone resin if the S—B—S type block polymer and the S—I—S type block polymer are used in combination.

COMPARATIVE EXAMPLE

Solution-type pressure-sensitive adhesives were prepared in the same way as in Example 8 except that polymer H obtained in Referential Example 1 was used instead of the polymer C obtained in Referential Example 1 as a tackifying resin, and the properties of these adhesives were evaluated in the same way as in Example 1. The results are shown in Table 9.

Table 9

| Sample | 41 | 42 | 43 | 44 | 45 | 46 |
|---|---|---|---|---|---|---|
| Recipes | | | | | | |
| S-B-S type block polymer (parts) | 100 | 85 | 70 | 50 | 35 | — |
| S-I-S type block polymer (parts) | — | 15 | 30 | 50 | 65 | 100 |
| Properties | | | | | | |
| Tackiness (1/32 inch) | 3 | 5 | 10 | 19 | 29 | 29 |
| Adhesive strength (g/inch) | 1150 | 1200 | 1340 | 1520 | 1600 | 1610 |
| Cohesive strength (minutes) | 16 | 20 | 30 | 40 | 120< | 120< |

These results demonstrate that when a hydrocarbon resin not containing α-methylstyrene is used as a tackifying resin, the synergistic effect of the S—B—S type block polymer and the S—I—S type block polymer cannot be obtained.

EXAMPLE 9

70 Parts of the S—B—S type block polymer obtained in Referential Example 2, 30 parts of the S—I—S type block polymer obtained in Referential Example 3, 100 parts of the tackifying resin obtained in Referential Example 1 (polymer A, polymer B, or polymer C), 60 parts of a naphthenic process oil and 1 part of an antioxidant were melted by heating at 170° C. to form a uniform composition. The composition in the molten state was coated on a 1 mm-thick polyester film to a thickness of 50 microns to form an adhesive tape. In the same way as in Example 6, the tackiness, adhesive strength and cohesive strength of the resulting adhesive tapes were measured, and found to be substantially the same as those of the solution-type pressure-sensitive adhesives obtained in Example 6. Polymer C exhibited the best operability in the coating of the resulting adhesive in the molten state on a polyester film, and polymer B and polymer A came next in this order.

What we claim is:

1. An adhesive composition consisting essentially of
   (A) 100 parts by weight of an elastomer consisting of
      (I) 30 to 100% by weight of a thermoplastic elastomer expressed by the general formula $(S-B)_n$ or $(S-B)_{n-1}—S$ in which S is substantially a polystyrene block, B is substantially a polybutadiene block, and n is an integer of from 2 to 10, and (II) 70 to 0% by weight of a thermoplastic elastomer expressed by the general formula $(S—I)_n$ or $(S-I)_{n-1}—S$ in which S is substantially a polystyrene block, I is substantially a polyisoprene block, and n is an integer of from 2 to 10, and
   (B) 50 to 250 parts by weight of a hydrocarbon tackifier resin containing 40 to 95% by weight of a 1,3-pentadiene unit and 60 to 5% by weight of an α-methylstyrene unit in the polymer chain and having a softening point of 60° to 140° C.

2. The adhesive composition of claim 1 wherein n in the general formulae is 2.

3. The adhesive composition of claim 1 wherein both the thermoplastic elastomers (I) and (II) contain 10 to 70% by weight of a styrene unit and have an average molecular weight of 25,000 and 500,000.

4. The adhesive composition of claim 1 which further contains a softening agent in an amount of 5 to 200 parts by weight per 100 parts by weight of the elastomer (A).

5. The adhesive composition of claim 4 wherein the softening agent is an ester-type synthetic oil, a liquid resin or an extender oil.

6. A pressure-sensitive adhesive in a solution form prepared from the adhesive composition of claim 1.

7. The adhesive composition of claim 6 which comprises 60 to 200 parts by weight of the hydrocarbon tackifier resin (B) per 100 parts by weight of elastomer (A).

8. The adhesive composition of claim 6 is which the hydrocarbon tackifier resin (B) further contains from 3 to 25% by weight, of a cyclopentene unit in the polymer chain.

9. The adhesive composition of claim 7 in which the hydrocarbon tackifier resin (B) comprises about 60% by weight of 1,3-pentadiene structural units, about 25% by weight of α-methylstyrene structural units, about 10% by weight of cyclopentene structural units and about 5% by weight of 1,3-butadiene structural units.

10. The adhesive composition of claim 7 which further contains a softening agent selected from the group consisting of an ester-type synthetic oil, a liquid resin and an extender oil, in an amount of 5 to 200 parts by weight per 100 parts by weight of the elastomer (A).

11. A hot-melt pressure-sensitive adhesive prepared from the adhesive composition of claim 1.

12. The adhesive composition of claim 11 in which the hydrocarbon tackifier resin (B) contains 60 to 90% by weight of a 1,3-pentadiene unit and 40 to 10% by weight of an α-methylstyrene unit in the polymer chain.

13. The adhesive composition of claim 1 wherein the hydrocarbon tackifier resin (B) is the Friedel-Crafts catalyst polymerized reaction product of a monomeric mixture of 1,3-pentadiene and α-methylstyrene.

14. The adhesive composition of claim 13 in which the hydrocarbon tackifier resin (B) further contains from 1 to 25% by weight of a 1,3-butadiene unit in the polymer chain.

15. The adhesive composition of claim 2 wherein both the thermoplastic elastomer (I) and (II) contain 10 to 70% by weight of a styrene unit and have an average molecular weight of 25,000 to 500,000.

16. An adhesive composition consisting essentially of
(A) 100 parts by weight of an elastomer consisting of
(I) 30 to 100% by weight of a thermoplastic elastomer expressed by the general formula $(S-B)_n$ or $(S-B)_{n-1}-S$ in which S is substantially a polystyrene block, B is substantially a polybutadiene block, and $n$ is an integer of from 2 to 10, and (II) 70 to 0% by weight of a thermoplastic elastomer expressed by the general formula $(S-I)_n$ or $(S-I)_{n-1}-S$ in which S is substantially a polystyrene block, I is substantially a polyisoprene block, and n is an integer of from 2 to 10, and
(B) 50 to 250 parts by weight of a hydrocarbon tackifier resin containing 40 to 95% by weight of a 1,3-pentadiene unit, 60 to 5% by weight of an α-methylstyrene unit and 3 to 25% by weight of a cyclopentene unit in the polymer chain and having a softening point of 60° to 140° C.

17. An adhesive composition consisting essentially of
(A) 100 parts by weight of an elastomer consisting of
(I) 30 to 100% by weight of a thermoplastic elastomer expressed by the general formula $(S-B)_n$ or $(S-B)_{n-1}-S$ in which S is substantially a polystyrene block, B is substantially a polybutadiene block, and n is an integer of from 2 to 10, and (II) 70 to 0% by weight of a thermoplastic elastomer expressed by the general formula $(S-I)_n$ or $(S-I)_{n-1}-S$ in which S is substantially a polystyrene block, I is substantially a polyisoprene block, and $n$ is an integer of from 2 to 10, and
(B) 50 to 250 parts by weight of a hydrocarbon tackifier resin containing 40 to 95% by weight of a 1,3-pentadiene unit, 60 to 5% by weight of an α-methylstyrene unit, 3 to 25% by weight of a cyclopentene unit and 1 to 25% by weight of a 1,3-butadiene unit in the polymer chain and having a softening point of 60° to 140° C.

18. An adhesive composition consisting essentially of
(A) 100 parts by weight of an elastomer consisting of
(I) 35 to 85% by weight of a thermoplastic elastomer expressed by the general formula $(S-B)_n$ or $(S-B)_{n-1}-S$ in which S is substantially a polystyrene block, B is substantially a polybutadiene block, and $n$ is an integer of from 2 to 10, and (II) 65 to 15% by weight of a thermoplastic elastomer expressed by the general formula $(S-I)_n$ or $(S-I)_{n-1}-S$ in which S is substantially a polystyrene block, I is substantially a polyisoprene block, and $n$ is an integer of from 2 to 10, and
(B) 60 to 200 parts by weight of a hydrocarbon tackifier resin containing 60 to 90% by weight of a 1,3-pentadiene unit and 40 to 10% by weight of an α-methylstyrene unit in the polymer chain and having a softening point of 60° to 140° C.

19. The adhesive composition of claim 18 in which elastomer (A) contains 35 to 85% of thermoplastic elastomer (I) and 65 to 15% by weight of thermoplastic elastomer (II).

20. The adhesive composition of claim 19 in which the hydrocarbon tackifier resin (B) further contains from 5 to 20% by weight of a cyclopentene unit and 2 to 20% by weight of a 1,3-butadiene unit in the polymer chain.

* * * * *